June 23, 1970 P. CHARLTON 3,516,375
HORIZON INDICATORS FOR ASSISTING HELICOPTER LANDINGS ON SHIPS
Filed Oct. 21, 1968 2 Sheets-Sheet 1
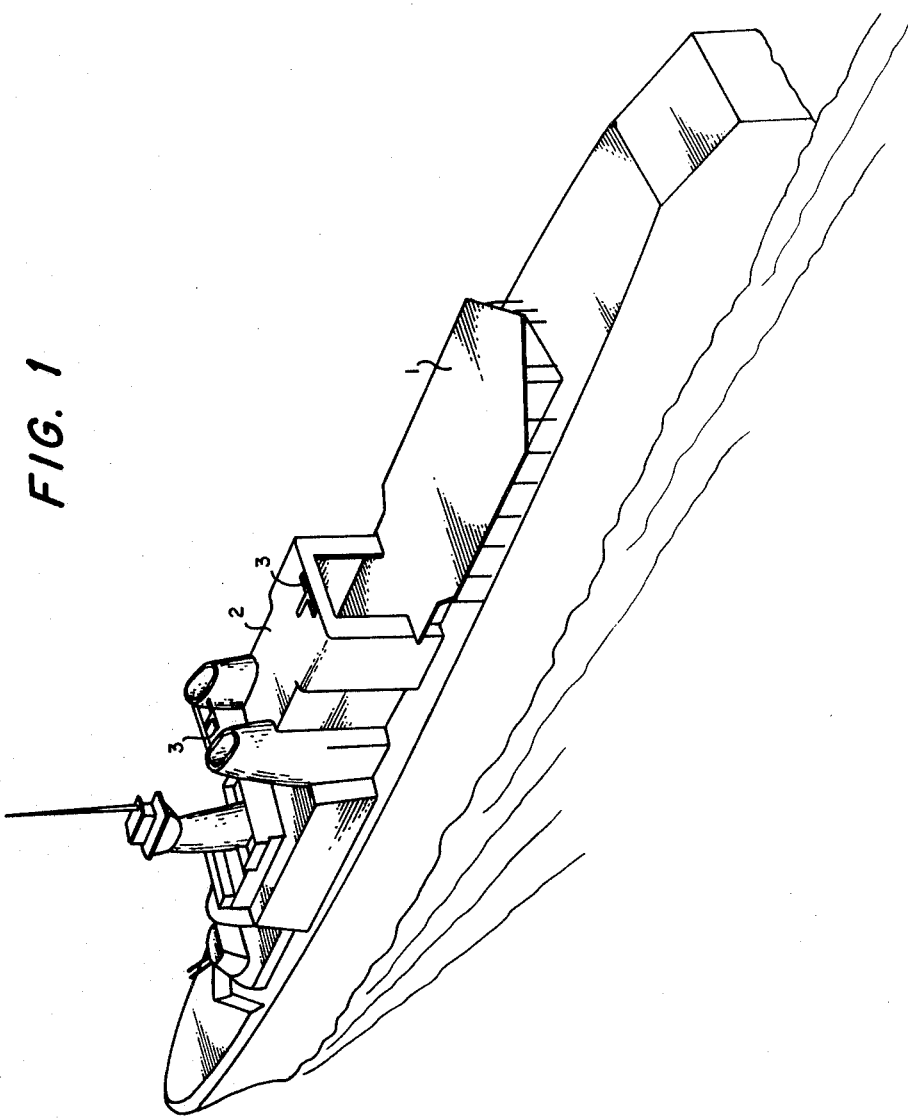
INVENTOR
PETER CHARLTON
BY
ATTORNEYS

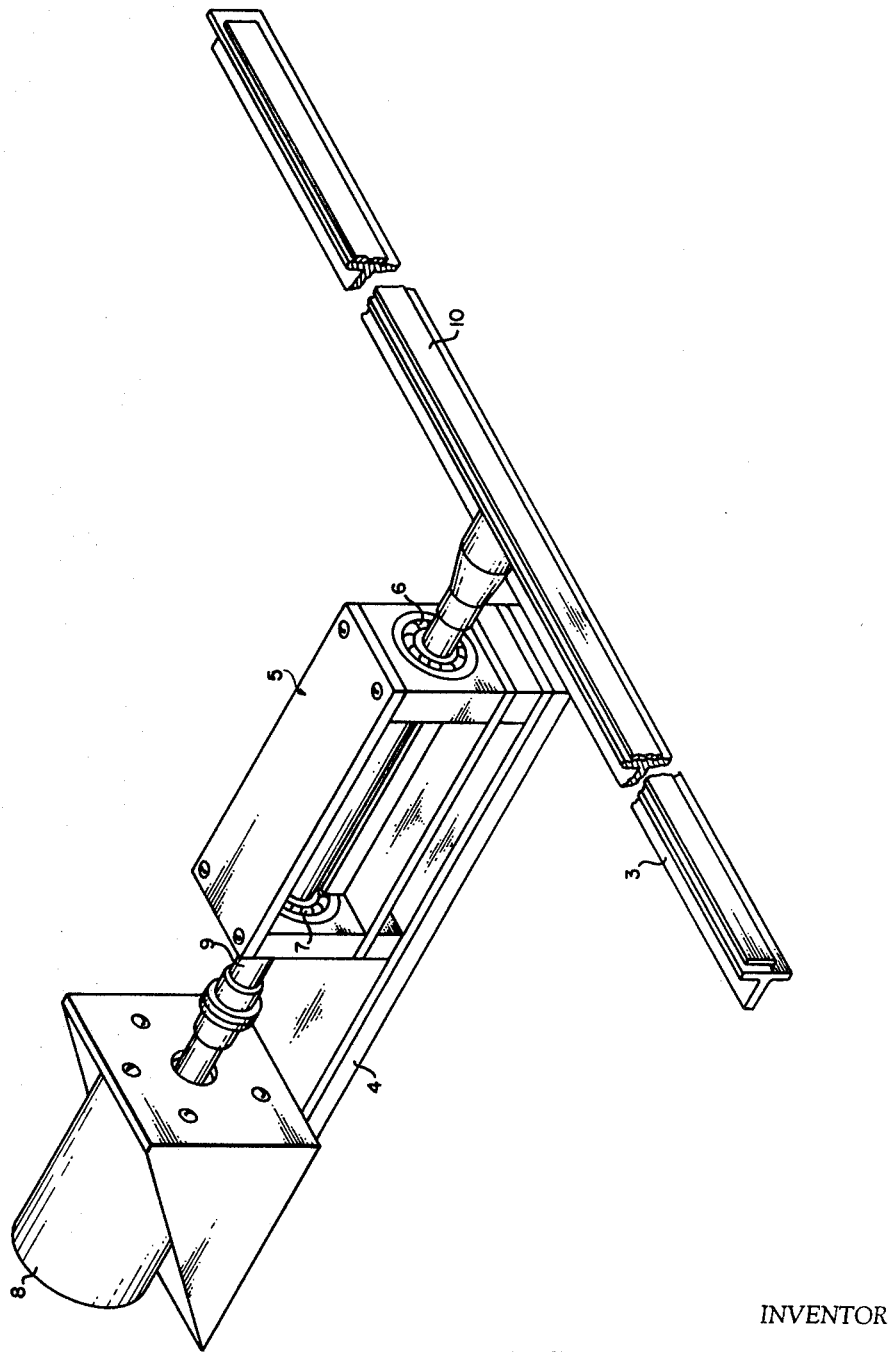

U.S. Cl. 114—43.5

3,516,375
HORIZON INDICATORS FOR ASSISTING HELICOPTER LANDINGS ON SHIPS
Peter Charlton, Ottawa, Ontario, Canada, assignor to Her Majesty the Queen of Canada, as represented by the Minister of National Defence
Filed Oct. 21, 1968, Ser. No. 769,273
Int. Cl. B63b 35/50
9 Claims

ABSTRACT OF THE DISCLOSURE

This invention relates to a device for assisting pilots of helicopters to land safely on the decks of ships. An indicator bar is utilized to display the true horizon to the pilots. The indicator is mounted on the ship transversely thereof for pivotal movement about an axis parallel to the axis of the ship and may be maintained in the horizontal plane independently of the ship's movements by a servo-mechanism coupled to the ship's gyro.

---

The invention described herein may be manufactured and used by or for the Government of the United States of America for governmental purposes without the payment of any royalties thereon or therefor.

This invention relates to ships having helicopter-landing areas and to the provisions of means to aid the pilot of a helicopter landing thereon.

It has been found that, during the final stages of landing a helicopter on a ship at night or in other bad visibility conditions, the pilot tends to overcorrect the attitude of the helicopter relative to the ship. It is believed that this is because the pilot tends to lose his appreciation of the true horizon as the ship changes its attitude relative to the horizontal plane. Clearly the consequences of such over-correction may be dangerous.

The general purpose of this invention is to provide a device which is suitable for mounting on any ship having a helicopter landing area thereon and which is capable of displaying the true horizon to helicopter pilots. The invention includes a horizon-indicating apparatus having an elongated indicator member mounted for angular movement about an axis transverse to the length of the member on a suitable part of the ship in a position visible to the pilot of a helicopter, and means for maintaining the indicator member in a horizontal attitude independently of the ship's movements from the horizontal plane as caused by the action of the waves and other factors. Thus, when landing, the pilot can see the indicator member and therefore does not lose his appreciation of the true horizon and consequently is better able to make a safe landing. Where the ship has a helicopter hangar adjacent the landing area, the indicator member may be mounted on the roof of the hangar.

An object of the present invention is to eliminate some of the hazards involved in the landing of helicopters on ships at sea.

Another object is to provide a device for continually displaying the true horizon even though the platform on which the device is mounted may deviate from the horizontal plane.

Other objects, advantages, and improvements of this invention will be apparent from the following description when considered in conjunction with the accompanying drawings illustrating one embodiment of the invention, wherein:

FIG. 1 is a perspective view of a ship provided with two horizon-indicating apparatuses, and FIG. 2 is a perspective view of one of the horizon-indicating apparatuses.

Referring to the drawings, FIG. 1 shows a ship having a helicopter-landing area 1 in the rear part of the ship, and a helicopter hangar 2 located forwardly of and adjacent to the landing area 1.

The ship is provided with two horizon-indicating apparatuses, each having a horizontally-maintained elongated indicator bar 3. The first bar 3 is mounted on the hangar roof adjacent the end thereof nearest the landing area 1. The second indicator bar 3 is mounted adjacent the other end of the hangar roof on a bridge between two funnels, so as to be in an elevated position relative to the first indicator bar 3.

Each indicator bar 3 extends transversely of the ship, and is mounted for angular movement about an axis which is transverse to the length of the bar 3 and extends along the central longitudinal axis of the ship. Each bar 3 is therefore located mid-way between the sides of the ship.

One indicator bar 3 and associated equipment is shown in FIG. 2. The equipment includes a support 4 carrying a housing 5 containing two bearings 6, 7 at opposite ends thereof. The support 4 also carries an electrically-operated servo-actuator 8 from which extends a shaft 9. The shaft 9 extends from the actuator 8 through the bearings 6, 7 in the housing 5, and the indicator bar 3 is secured at a position mid-way along its length to the end of the shaft 9 projecting from the bearing 6, such that the shaft 9 extends perpendicularly to the length of the bar 3. The support 4 is secured to the appropriate part of the ship in such a manner that the shaft 9 extends parallel to the longitudinal axis of the ship and is located mid-way between its sides. The actuator 8 is controlled by a ship's gyro acting through a servo-amplifier system to maintain the bar 3 in a horizontal attitude during rolling motion of the ship.

Electro-luminescent tape 10 may be fitted to the face of the bar 3 facing the landing area 1, and a suitable electrical power supply to the tape 10 may be adjustable in magnitude and/or frequency to vary the brightness of the tape 10.

The apparatus illustrated in FIG. 2 can easily be attached to a suitable part of the ship, and the actuator 8 can easily be connected to a ship's gyro and amplifier system.

When landing a helicopter on the ship, the pilot will cause the helicopter to approach the landing area 1 from the rear of the ship, and will be able to see both indicator bars 3. The bars 3 will be located one behind the other in the pilot's view, and this arrangement will provide improved depth perception to the pilot as well as indicating the horizon, thus enabling the pilot to land the helicopter with a greater degree of safety than was possible prior to this invention.

Obviously many modifications and variations of this invention are possible in light of the above teachings. It is therefore to be understood that within the scope of the appended claims, the invention may be practiced otherwise than as specifically described.

What is claimed and desired to be secured by Letters Patent of the United States is:

1. In a ship having a helicopter landing area thereon and a gyro, an horizon indicator comprising:
    an elongated indicator member adapted to be mounted on a part of a ship which is elevated above the landing area so as to be visible to a pilot of a helicopter when landing on said area,
    said indicator member being mounted for angular movement about an axis transverse to its length, and
    means for maintaining said indicator member in the horizontal plane independently of movement of said landing surface.

2. The indicator of claim 1 wherein:
said means for maintaining the indicator member in the horizontal plane includes a servo-motor connected to said member and adapted to be coupled to the ship's gyro for actuation in response to changes in the ship's attitude as detected by the gyro.

3. The indicator of claim 1 further comprising:
an elongated shaft connected to said indicator member midway along the length thereof and extending perpendicular thereto,
a support housing having first and second spaced apart bearings,
said shaft being received within said bearings for rotation movement therein, and
said means for maintaining the indicator member in the horizontal plane being connected to said shaft.

4. The indicator of claim 3 wherein:
said maintaining means includes a servo-motor operatively assoicated with the ship's gyro for actuation in response to changes in the ship's attitude as sensed by the gyro.

5. The indicator of claim 4 further comprising:
luminescent means secured to said indicator member and extending along the length thereof.

6. The indicator of claim 3 wherein:
said shaft is mounted in the support with its axis being parallel to the longitudinal axis of the ship.

7. The indicator of claim 6 wherein:
said shaft is mounted in the support midway between the sides of the ship.

8. The combination of claim 1 further comprising:
a second indicator member adapted to be mounted on the ship to be visible to a pilot of a helicopter landing on said area,
means for maintaining said second indicator member in the horizontal plane,
said second indicator member being mounted on the ship at a position between the ship's bow and the first mentioned indicator member.

9. The combination of claim 8 wherein:
said second indicator member is mounted on the ship in an elevated position above the first mentioned indicator member.

References Cited

UNITED STATES PATENTS

| | | | |
|---|---|---|---|
| 1,558,567 | 10/1925 | Schein | 114—43.5 |
| 2,368,159 | 1/1945 | Robins | 114—43.5 |

TRYGVE M. BLIX, Primary Examiner

UNITED STATES PATENT OFFICE
CERTIFICATE OF CORRECTION

Patent No. 3,516,375          Dated June 23, 1970

Inventor(s) Peter Charlton

It is certified that error appears in the above-identified patent and that said Letters Patent are hereby corrected as shown below:

In the heading to the printed specification, lines 4 to 6, "assignor to Her Majesty the Queen of Canada, as represented by the Minister of National Defence" should read -- assignor to Her Majesty the Queen in right of Canada, as represented by the Minister of National Defence --.

Signed and sealed this 4th day of May 1971.

(SEAL)
Attest:

EDWARD M. FLETCHER, JR.
Attesting Officer

WILLIAM E. SCHUYLER, JR.
Commissioner of Patents